(12) United States Patent
Dannhauer et al.

(10) Patent No.: US 7,243,550 B2
(45) Date of Patent: Jul. 17, 2007

(54) RELATIVE PRESSURE SENSOR HAVING AN ATMOSPHERE-SIDE DAMPER

(75) Inventors: Wolfgang Dannhauer, Teltow (DE); Dietfried Burczyk, Teltow (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/533,253

(22) PCT Filed: Oct. 31, 2003

(86) PCT No.: PCT/EP03/12115

§ 371 (c)(1),
(2), (4) Date: Dec. 27, 2005

(87) PCT Pub. No.: WO2004/042338

PCT Pub. Date: May 21, 2004

(65) Prior Publication Data

US 2006/0169047 A1    Aug. 3, 2006

(30) Foreign Application Priority Data

Nov. 5, 2002   (DE) ................. 102 51 748

(51) Int. Cl.
*G01L 7/08* (2006.01)

(52) U.S. Cl. ................. 73/715; 73/707; 73/716

(58) Field of Classification Search ......... 73/700–756; 361/283.1–283.4
See application file for complete search history.

(56) References Cited

U.S. PATENT DOCUMENTS

| | | | | | |
|---|---|---|---|---|---|
| 3,596,520 | A | * | 8/1971 | Sanford ................. | 73/708 |
| 4,169,389 | A | * | 10/1979 | Yasuhara et al. ......... | 73/718 |
| 4,203,327 | A | * | 5/1980 | Singh .................. | 73/721 |
| 4,527,428 | A | * | 7/1985 | Shimada et al. ......... | 73/721 |
| 4,668,889 | A | * | 5/1987 | Adams ................. | 310/338 |
| 4,713,969 | A | * | 12/1987 | Ishii ................... | 73/706 |
| 4,995,266 | A | * | 2/1991 | Tobita et al. ........... | 73/706 |
| 5,531,120 | A | * | 7/1996 | Nagasu et al. .......... | 73/706 |
| 5,583,294 | A | * | 12/1996 | Karas ................. | 73/706 |
| 6,279,401 | B1 | * | 8/2001 | Karas ................. | 73/716 |
| 6,813,953 | B2 | * | 11/2004 | Baba et al. ............ | 73/715 |

* cited by examiner

*Primary Examiner*—Edward Lefkowitz
*Assistant Examiner*—Jermaine Jenkins
(74) *Attorney, Agent, or Firm*—Bacon & Thomas, PLLC

(57) ABSTRACT

A relative pressure sensor comprises two chambers and two separating membranes respectively provided for a process pressure and an ambient pressure. The chambers are separated by a pressure-sensitive element and are filled with a transmission medium. In order to attenuate process-side overload pulses, which act upon the first separating membrane, a hydraulic damper is provided that is placed on the side of the atmosphere between the second separating membrane and the pressure-sensitive element. The pressure-sensitive element is a piezoresistive silicon chip, the transmission medium consists of silicone oil, and the damper is comprised of a filter element made of sintered bronze having 29% porosity and an 11 micrometer pore diameter. The filter element has a length of 8 mm and a diameter of 2 mm.

9 Claims, 2 Drawing Sheets

RELATIVE PRESSURE SENSOR HAVING AN ATMOSPHERE-SIDE DAMPER

FIELD OF THE INVENTION

The present invention relates to a relative pressure sensor with hydraulic pressure transmission.

BACKGROUND OF THE INVENTION

Such pressure sensors include, as a rule, a measuring unit with two chambers, each of which is sealed by a separating membrane, or diaphragm, and filled with a transmission medium. The separating membranes are loaded, respectively, with a pressure being measured and with a reference pressure. These pressures are transmitted via the separating membranes into the respective chambers. The chambers are separated from one another by a sensor element in the form of a pressure sensitive element, especially a measuring membrane, which is loaded on its first surface with the hydraulic pressure in the first half-cell and on its second surface with the hydraulic pressure in the second half-cell.

The present invention relates to a relative pressure sensor with hydraulic pressure transmission. Such pressure sensors include, as a rule, a measuring unit with two chambers, each of which is sealed by a separating membrane, or diaphragm, and filled with a transmission medium. The separating membranes are loaded, respectively, with a pressure being measured and with a reference pressure. These pressures are transmitted via the separating membranes into the respective chambers. The chambers are separated from one another by a sensor element in the form of a pressure sensitive element, especially a measuring membrane, which is loaded on its first surface with the hydraulic pressure in the first half-cell and on its second surface with the hydraulic pressure in the second half-cell.

The second (atmosphere-side) separating membrane serves, on the one hand, for temperature compensation of the first degree in the case of small measuring ranges, and, on the other hand, for the "second-containment", i.e. for additional protection of the environment of the device in the case of malfunctions, e.g. rupture of the first (process-side) separating membrane and/or the measuring membrane.

Especially pressure-sensitive elements of semiconductor materials have a stiffness such that the volume stroke at the pressure-sensitive element is practically negligible over the entire measuring range. This means, however, negatively, that the pressure-sensitive elements are very sensitive to needle-like pressure spikes, since scarcely any elasticity is present for absorbing such, so that a destruction of the measuring cell can result. By simple lessening of the diameter of the pressure supply line between the process-side chamber and the pressure-sensitive element, the needle pulses cannot be effectively damped, or attenuated.

German Offenlegungsschrift (laid-open application) DE 37 13 236 A1 discloses, instead, the installing, between process and the measuring cell, of a sintered metal plate, or a steel plate with one bore, or a plurality of parallel bores, of, at most, 0.5 mm diameter. This solution is not satisfactory for various reasons. On the one hand, the reduction of the hydraulic path between process and measuring cell to even a single bore of 0.5 mm diameter and bore length such as is to be expected from the shown plate thickness, offers, by far, no sufficient damping for suppressing needle-shaped, overloading, pressure spikes. On the other hand, if a damping element of a sufficiently great flow resistance for an effective damping is provided, then the reaction velocity of the sensor is significantly slowed, so that then pressure fluctuations within the measuring range of the sensor are registered only with delay.

SUMMARY OF THE INVENTION

An object of the present invention is, therefore, to provide a pressure sensor which overcomes the described disadvantages.

The object is solved by a relative pressure sensor comprising a measuring unit having: a first chamber, which is sealed by a first separating membrane and filled with a transmission medium, said first separating membrane being loadable with the process pressure; a second chamber, which is sealed by a second separating membrane and filled with a transmission medium, said second separating membrane being loadable with the ambient pressure; a pressure-sensitive element, which separates said first chamber from said second chamber; and a damper for damping excess-pressure pulses, wherein said damper is arranged between said pressure-sensitive element and said second separating membrane.

The relative pressure sensor of the invention includes a measuring unit having a first chamber, which is sealed by a first separating membrane, and a second chamber, which is sealed by a second separating membrane, with the first separating membrane being loadable with a process pressure and the second separating membrane with atmospheric pressure, thus the relevant ambient pressure, and the first chamber being separated from the second chamber by a pressure-sensitive element, especially a measuring membrane, the first and second chambers being filled with a transmission medium, and wherein, additionally, the second chamber contains a hydraulic damper, which is arranged between the second separating membrane and the pressure sensitive element.

The damper comprises, preferably, a porous body, especially a porous, sintered body, especially preferably a sintered body of a metal or ceramic material, especially a corundum filter or bronze filter. Suitable bronze filters are obtainable, for example, from the firm GKN in Radevormwald, Germany, under the designation SIKA-B.

The damper is preferably dimensioned such that the volume flow evoked via the measuring membrane in the second chamber by a process-side, excess-pressure spike experiences such a great flow resistance due to the damper, that the measuring membrane is supported on its rear side by hydraulic pressure between the measuring membrane and the damper.

Slow volume flows through the damper are, in contrast, quite possible, so that, on the one hand, an equalizing of volume changes of the transmission liquid due to temperature changes can occur, and, on the other hand, the relatively slow fluctuations of the ambient, or atmospheric, pressure can be transmitted sufficiently quickly to the measuring membrane.

Preferably, the effective pore diameter for flow, as determined with Coulter Porometer according to ASTM E 1294, with isopropanol as wetting agent, is not less than 4 $\mu$m and not more than 28 $\mu$m, with effective pore diameters between 8 $\mu$m and 16 $\mu$m being currently especially preferred. The effective pore diameters are preferably used in combination with a porosity between 15 vol. % and 50 vol. %, especially preferably between 25 vol. % and 35 vol. %.

Cylindrical damper bodies are preferred, due to the fact that such can be placed easily in the second chamber in complementary bores. Preferably, the damper bodies have a length, which is at least twice as large as the diameter of the damper bodies, with the length of the damper body being about four times the diameter in a currently especially preferred form of embodiment.

The specifics of the damper regarding pore size, porosity and geometric dimensions depend in particular cases on, among other things, the ability of the membrane to withstand pressure and on the overloads to be expected, as well as on the boundary conditions of the design. It is within the ability of those skilled in the art to optimize the design of the damper for a given pressure sensor.

A further parameter is the amount of transmission liquid enclosed between the pressure-sensitive element and the damper. To the degree that the transmission liquid is slightly compressible, the supporting action of the damper is decreased, the greater the volume of the transmission liquid is between the measuring membrane and the damper. Preferably, this volume should be minimized, within the constraints of the boundary conditions of the design.

BRIEF DESCRIPTION OF THE DRAWINGS

The invention will now be explained in greater detail on the basis of the example of an embodiment illustrated in FIG. 1 and the data shown in FIG. 2.

The figures show as follows.

DETAILED DESCRIPTION

Figure 1:
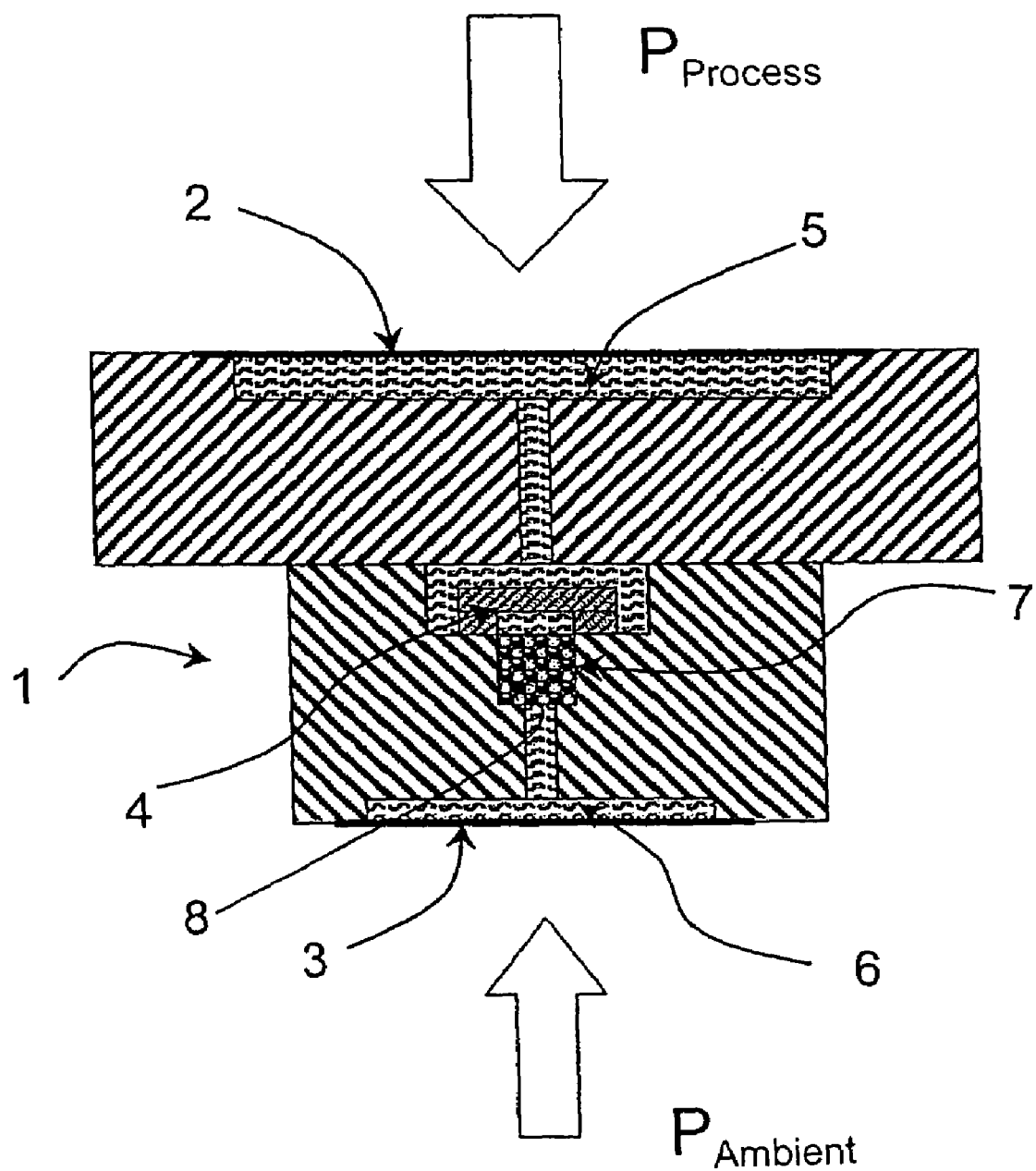
FIG. 1 a cross section through a relative pressure sensor of the invention.

The relative pressure sensor shown in FIG. 1 includes a measuring unit 1 having a first chamber 5, which is sealed on the process-side by a first separating membrane 2, and a second chamber 6, which is sealed on the atmosphere-side by a second separating membrane 3. Inside the measuring unit 1 is a pressure-sensitive element 4, which includes a measuring membrane, or diaphragm. The pressure-sensitive element 4 separates the first chamber 5 from the second chamber 6. In the preferred form of embodiment, the pressure-sensitive element is a piezoresistive silicon chip. In principle, the invention is, however, independent of the principle by which the pressure-sensitive element works.

The first chamber and the second chamber are completely filled with a transmission medium, preferably a silicone oil.

Arranged in the second chamber is a damper 7. To this end, the second chamber includes a bore 8, in which the damper is fixed by a force fit. Additionally, the damper is axially supported on the atmosphere-side, since the second chamber 6 includes a canal, which connects axially to the bore 8 and exhibits a lesser diameter than bore 8.

The preferred damper includes a filter element of sintered bronze with a porosity of about 29% and an effective pore diameter of about 11 µm. The preferred filter element has a length of 8 mm and a diameter of 2 mm (the proportions in FIG. 1 are not exact).

The arrangement of the invention leads to a sufficient damping of needle-shaped, excess-pressure spikes, while pressure pulses in the measuring range are registered sufficiently quickly, as will be explained now on the basis of FIG. 2.

Figure 2:
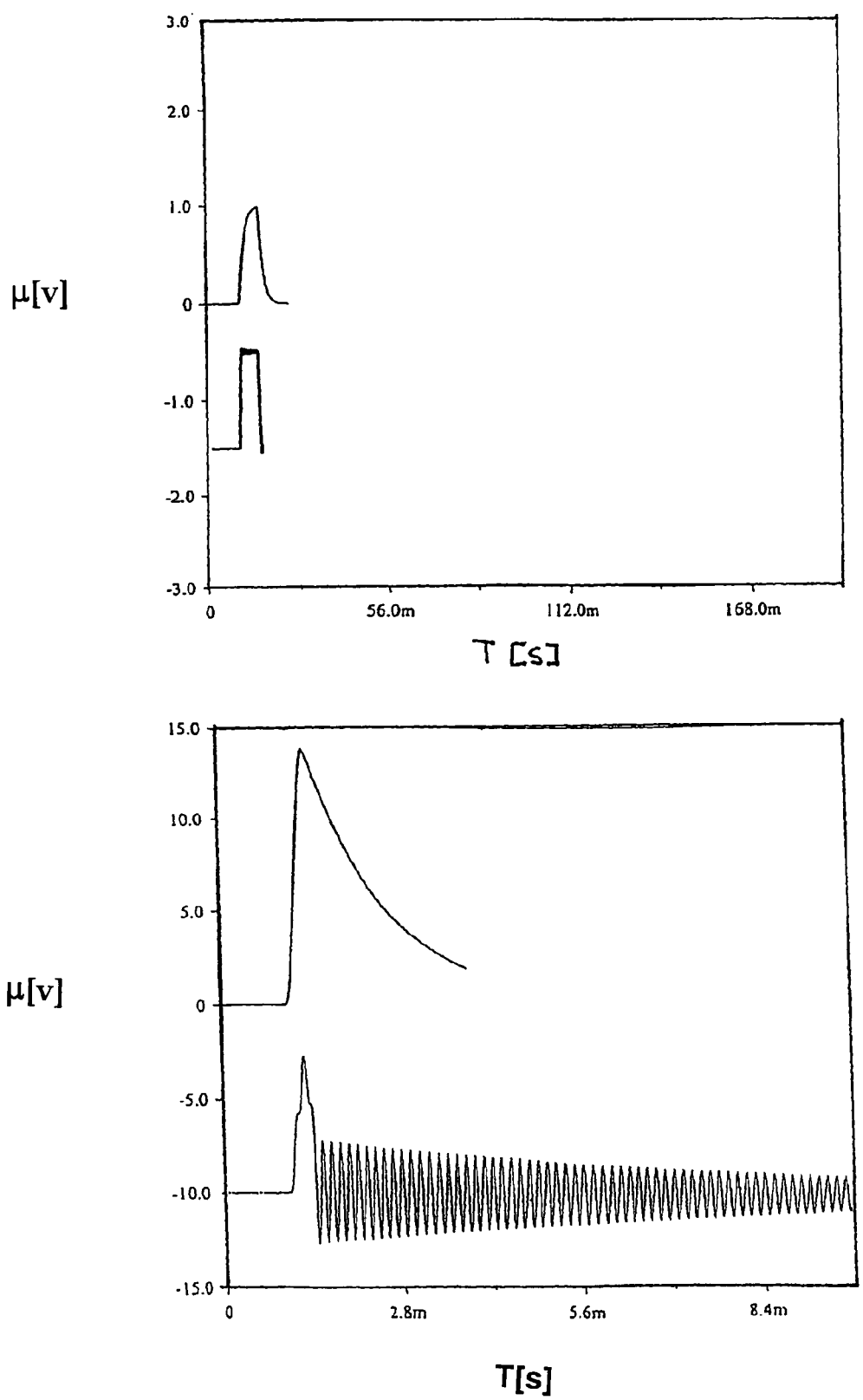
FIG. 2 simulation results for the response of a measuring membrane to a pressure pulse in the measuring range and a pressure pulse in the case of overload, in each case for a relative pressure sensor of the invention and a relative pressure sensor with a process-side damper.

For illustrating the way in which a relative pressure sensor of the invention works, FIG. 2 shows the results of simulations of the hydrodynamic characteristics of measuring units, using an electrodynamic model with the program PSPICE. In each of the two graphs of FIG. 2, the response of a relative pressure sensor about as in DE 37 13 236 A1, with a process-side damper (upper curve), is compared with the response of the relative pressure sensor of the invention (lower curve). Modeled as process-side damper was a canal with a length of 8 mm and a diameter of 0.2 mm. (A process-side damper in the manner of the atmosphere-side damper of the invention would lead to essentially the complete damping of the measurement signal and time constants far too long.) The term "response" means, here, the signal output from the pressure-sensitive element, which, naturally, is also a measure for the loading of the pressure-sensitive element. The measuring range for the simulated devices was, in each case, 1 bar (1 volt in the simulation).

The upper graph of FIG. 2 shows the response to a rectangular pulse with an amplitude of 1 bar, or 1 volt, which lies within the measuring range of the relative pressure sensor. The process-side damper of the state of the art smooths the rectangular pulse and is not able to follow its time-behavior sufficiently quickly. The atmosphere-side damper of the present invention, in contrast, hardly degrades the response to a rectangular pulse at all. The time behavior of the rectangular pulse is imaged error-free.

The origin of all curves is actually at 0 volts. However, in each graph, one of the curves was displaced by a constant amount, in order to improve the display.

The lower graph of FIG. 2 shows the response of the relative pressure sensors to a short, rectangular pulse in the case of overload with an amplitude of 100 bar, or 100 volts. The process-side damper effects a damping of the response down to about 14 bar, or 14 volts, with the greater time constant of the damper resulting in a slow decay of the response, as is shown in the upper curve. The damping produced by the atmosphere-side damper of the invention proves to be more effective, since the amplitude of the response lies at only about 7 bar, or 7 volts. Additionally, equilibrium position of the response falls more quickly back to the starting value due to the shorter time constant, with the response then exhibiting a damped oscillation about the equilibrium position. Naturally, it is easy in such case to extract the average value, using suitable evaluation circuitry.

In summary, the relative pressure sensor of the invention with an atmosphere-side damper proves itself to be advantageous, since the response function can follow rapid changes in the measuring range more quickly than is the case for relative pressure sensors with a process-side damper. Additionally, the damping of needle-shaped pressure pulses in the case of overload is at least as good as in the case of a relative pressure sensor of the state of the art.

The invention claimed is:

1. A relative pressure sensor for measuring a pressure difference between a process pressure and an ambient pressure, comprising a measuring unit, having:
   a first chamber, which is sealed by a first separating membrane and filled with a transmission medium, said first separating membrane being loadable with the process pressure;

a second chamber, which is sealed by a second separating membrane and filled with a transmission medium, said second separating membrane being loadable with the ambient pressure;

a pressure-sensitive element, which separates said first chamber from said second chamber; and a damper arranged only between said pressure-sensitive element and said second separating membrane, wherein:

said damper protects said pressure-sensitive element against the effect of excess-pressure pulses acting on said first separating membrane.

2. The relative pressure sensor as claimed in claim 1, wherein:

the transmission medium is a hydraulic liquid, especially a silicone oil.

3. The relative pressure sensor as claimed in claim 1, wherein:

said pressure-sensitive element comprises a measuring membrane, especially a piezoresistive silicon chip with a measuring membrane.

4. The relative pressure sensor as claimed in claim 1, wherein:

said damper comprises a sintered body.

5. The relative pressure sensor as claimed in claim 4, wherein;

the sintered body is a metallic or ceramic, sintered body.

6. The relative pressure sensor as claimed in claim 4, wherein:

the sintered body has an essentially cylindrical form and the length of the sintered body in the axial direction is at least twice as large as the diameter.

7. The relative pressure sensor as claimed in claim 1, wherein:

said damper has a porous structure.

8. The relative pressure sensor as claimed in claim 7, wherein:

the porous structure has a flow-effective pore diameter of not less than 4 μm and not more than 28 μm, preferably between 8 μm and 16 μm.

9. The relative pressure sensor as claimed in claim 8, wherein:

the porous structure has a porosity between 15 vol. % and 50 vol. %, preferably between 25 vol. % and 35 vol. %.

* * * * *